(12) United States Patent
Huegerich et al.

(10) Patent No.: US 9,439,535 B1
(45) Date of Patent: Sep. 13, 2016

(54) ROLLER GRILL TEMPERATURE CONTROL ASSEMBLIES AND METHODS FOR COOKING HUMAN FOOD

(71) Applicant: Star Manufacturing International, Inc., St. Louis, MO (US)

(72) Inventors: Michael L. Huegerich, St. Louis, MO (US); James G. Luntz, Clayton, MO (US)

(73) Assignee: Star Manufacturing International Inc., Saint Louis, MO (US)

( * ) Notice: Subject to any disclaimer, the term of this patent is extended or adjusted under 35 U.S.C. 154(b) by 7 days.

(21) Appl. No.: 14/318,007

(22) Filed: Jun. 27, 2014

Related U.S. Application Data

(60) Provisional application No. 61/843,215, filed on Jul. 5, 2013.

(51) Int. Cl.
*A47J 37/04* (2006.01)
*A47J 27/14* (2006.01)
*A23L 1/01* (2006.01)
*A47J 27/62* (2006.01)

(52) U.S. Cl.
CPC .............. *A47J 37/048* (2013.01); *A23L 1/01* (2013.01); *A47J 27/62* (2013.01)

(58) Field of Classification Search
CPC ............................. A47J 37/048; A47J 27/62
USPC .......................... 99/343, 342, 393, 395, 441
See application file for complete search history.

(56) References Cited

U.S. PATENT DOCUMENTS

| 5,934,181 | A | * | 8/1999 | Adamczewski | A47J 27/62 374/141 |
|---|---|---|---|---|---|
| 6,393,971 | B1 | | 5/2002 | Hunot et al. | |
| 6,474,223 | B2 | * | 11/2002 | Kurmlavage | A47J 37/048 374/141 |
| 6,707,015 | B2 | | 3/2004 | Huegerich et al. | |
| 8,148,669 | B2 | * | 4/2012 | Schwierking | A47J 37/048 219/483 |
| 2011/0253693 | A1 | * | 10/2011 | Lyons | A47J 27/00 219/209 |
| 2014/0033929 | A1 | * | 2/2014 | Humphrey | A47J 37/048 99/332 |

* cited by examiner

*Primary Examiner* — Reginald L Alexander
(74) *Attorney, Agent, or Firm* — Polster Lieder Woodruff & Lucchesi, L.C.

(57) ABSTRACT

Disclosures of roller tube grill temperature control assemblies and methods for human food have a sensing device to fit between a pair of tubes with sides that conform to the tube surface, and an associated temperature-sensing component for detecting the sensing device temperature. An electrical control arrangement in electrical connection with a heating element disposed within a tube can control electricity, with mechanisms to modify the set point. A biasing member biases the sensing device. Such device can also have on or more tube receiving inner openings located between the sides of the device. The sensing device can further be a bushing with one or more generally cylindrical openings to receive roller tube or tubes. The assembly moreover can have an infrared sensing device associated with a tube to sense radiation therefrom for detecting temperature.

16 Claims, 9 Drawing Sheets

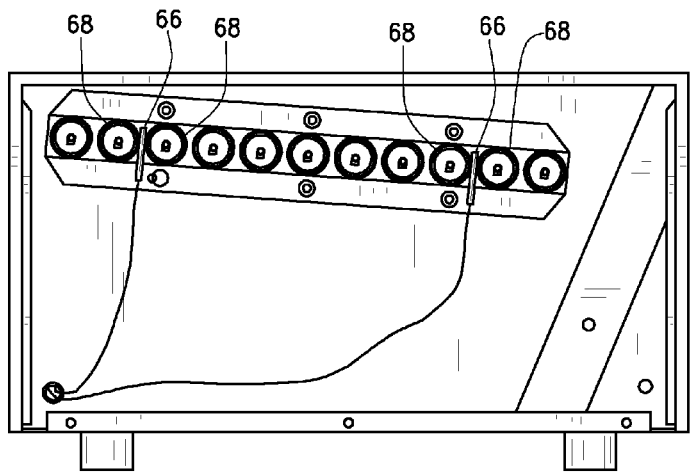
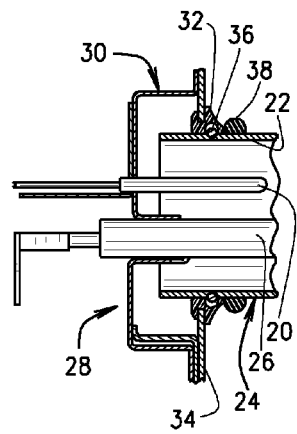
FIG. 3
PRIOR ART
FIG. 4
PRIOR ART
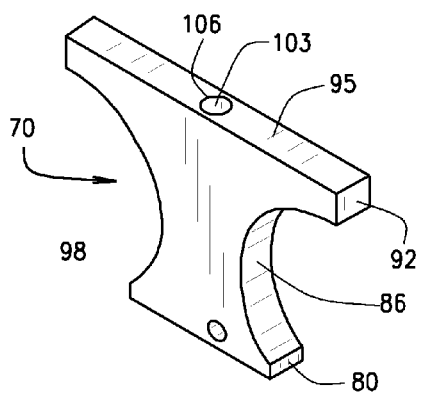
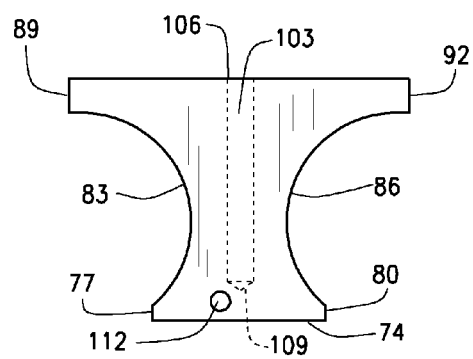
FIG. 5
FIG. 6
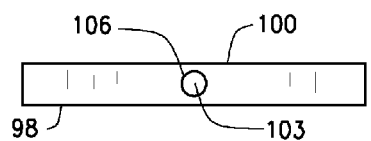
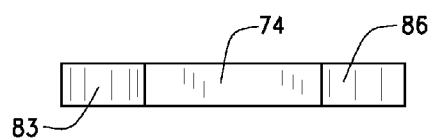
FIG. 7
FIG. 8

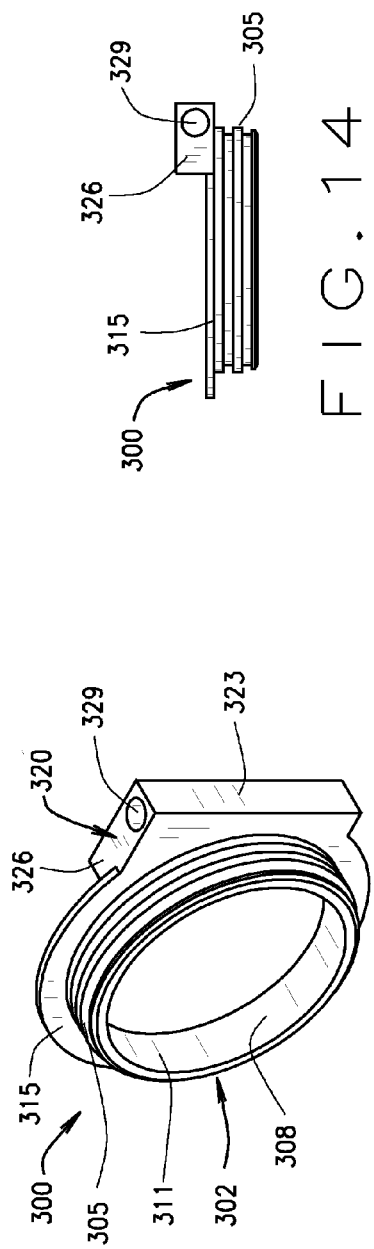
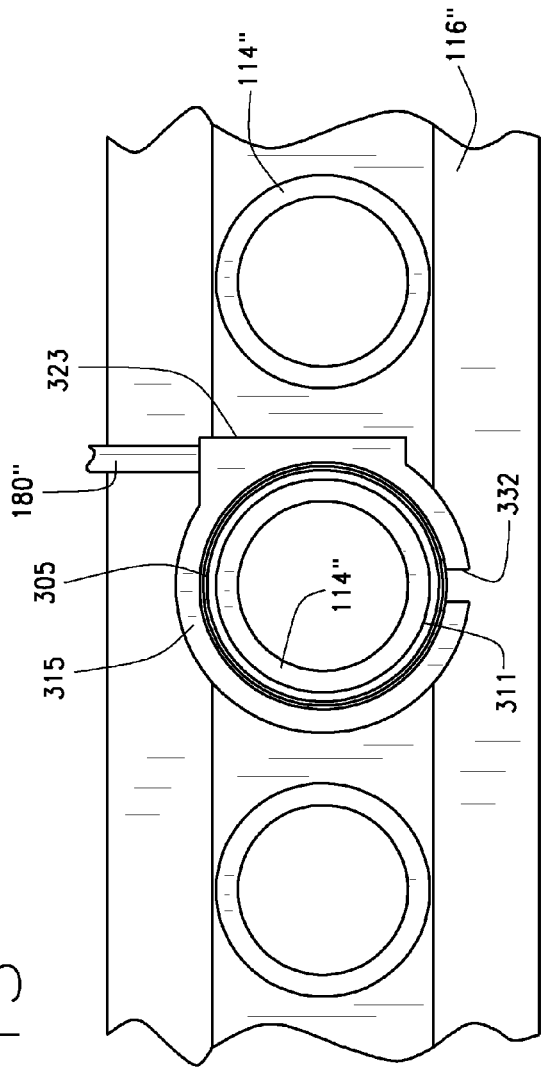

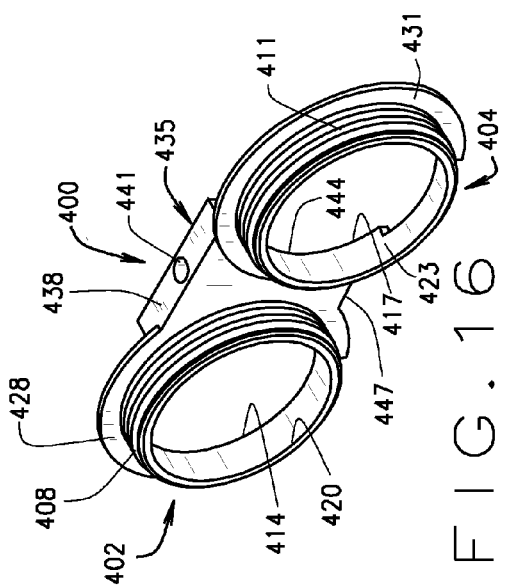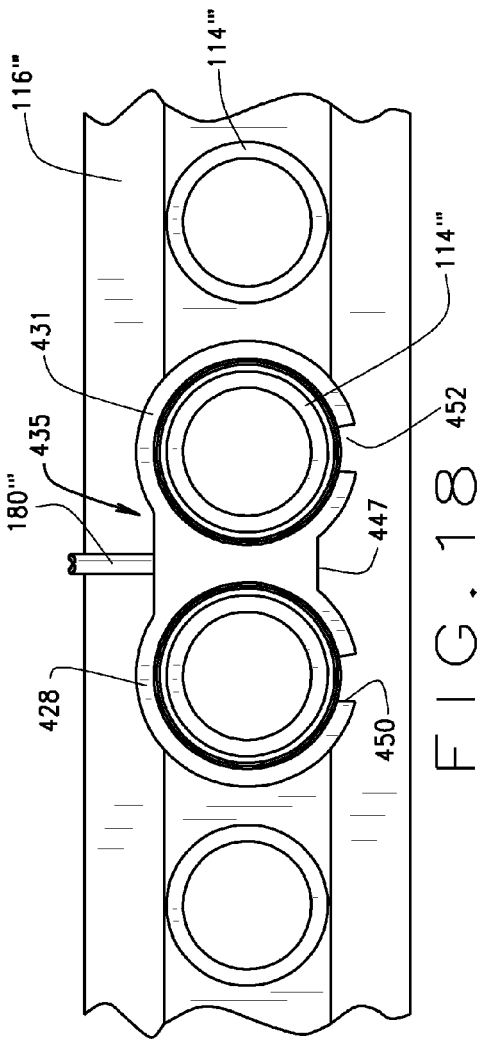

ROLLER GRILL TEMPERATURE CONTROL ASSEMBLIES AND METHODS FOR COOKING HUMAN FOOD

CROSS REFERENCE TO RELATED APPLICATIONS

This application claims priority to U.S. Provisional Patent Application No. 61/843,215, filed on Jul. 5, 2013 with named inventors Michael L. Huegerich and James G. Luntz, the disclosure of which is incorporated herein by reference in its entirety.

STATEMENT REGARDING FEDERALLY SPONSORED RESEARCH

Not Applicable

BACKGROUND OF THE INVENTION

Roller grill assemblies for cooking human food, such as disclosed in U.S. Pat. No. 6,393,971, have a group of heated rollers upon which food such as hot dogs, wieners, bratwurst, sausage, ground meat and the like can be cooked. Drawings from U.S. Pat. No. 6,393,971 are shown in FIGS. 1 and 2 hereof. Preferably temperatures of 140° F. are required for sanitation for the center of the product cooked upon the roller tubes.

The setting required to obtain the temperature of 140° F. for the center of product varies, for example, because of variance in product size, the constituency of the product, and whether there is a cover over the product, such as a sneeze guard. Control systems for controlling the temperature of tubes in roller grills have been employed, such as shown in U.S. Pat. No. 6,707,015 B2. U.S. Pat. No. 6,707,015, a drawing of which is shown in FIG. 3 hereof, discloses the use of sensors, such as thermistors encased in stainless steel, located between the ends of a pair of rollers and spaced therefrom.

FIG. 4 shows a prior art arrangement wherein a sensing device in the form of a thermistor within a steel jacket 20 is located to be spaced from the interior surface 22 of a roller tube 24, and spaced from a heating element 26. The thermistor 20 is thus surrounded by air. FIG. 4 also shows supporting brackets 28 and 30 for the heating element 26. A sealing bearing 32 is mounted to a housing wall 34, and about tube 24, with an O-ring 36 within an annular groove of bearing 32. Another O-ring 38 is to the interior of bearing 32.

BRIEF DESCRIPTION OF THE SEVERAL VIEWS OF THE DRAWINGS

Illustrative embodiments are shown in the drawings which form a part of the specification.

FIG. 3 is a side elevation of a prior art roller grill assembly such as disclosed in U.S. Pat. No. 6,707,015 B2, similar to the view of the roller grill assembly shown in FIG. 2 of that Patent;

FIG. 4 is a section view of a prior art roller grill assembly showing a thermistor used as a temperature sensor and located inside the roller tube spaced from the inner surface of the roller tube and spaced from the heating element inside the roller tube;

FIG. 5 is an isometric view of a first embodiment of a sensing device that is positioned to be in contact with the outer surfaces of roller tubes;

FIG. 6 is a rear elevation of the sensing device of FIG. 5;

FIG. 7 is a top plan view of the sensing device of FIG. 5;

FIG. 8 is a bottom plan view of the sensing device of FIG. 5;

FIG. 12 is a side elevation of a second embodiment of a sensing device, which has surfaces that allow contact of the device with the surfaces of four separate roller tubes;

FIG. 13 is an isometric view of a third embodiment of a sensing device, illustrating a sensing device and bushing combination that fits about a roller tube to be in contact with the roller tube for thermal conduction;

FIG. 14 is a top plan view of the sensing/bushing device of FIG. 13;

FIG. 15 is an elevation showing a sensing/bushing device of FIGS. 13 and 14 mounted about a roller tube to be in contact with the roller tube for thermal conduction;

FIG. 16 is an isometric view of a fourth embodiment of a sensing device showing a sensing/bushing device for mounting about a pair of roller tubes;

FIG. 17 is a top plan view of the sensing/bushing device of FIG. 16;

FIG. 18 is a side elevation of the sensing/bushing of FIGS. 16 and 17 mounted about a pair of roller tubes to be in contact with the roller tubes for thermal conduction;

Corresponding reference characters indicate corresponding parts throughout the several views of the drawings.

DETAILED DESCRIPTION OF INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

The temperature control assemblies disclosed herein are part of an integrated system for use in conjunction with roller grills. Typically roller grills have a group of heated roller tubes upon which food such as hot dogs, wieners, bratwurst, sausage, ground meat and the like can be cooked. Examples of such roller grills are shown and disclosed in U.S. Pat. No. 6,393,971 B1 and U.S. Pat. No. 6,707,015 B2, both of which patents are incorporated herein by reference as if fully set forth herein.

Figure 1:
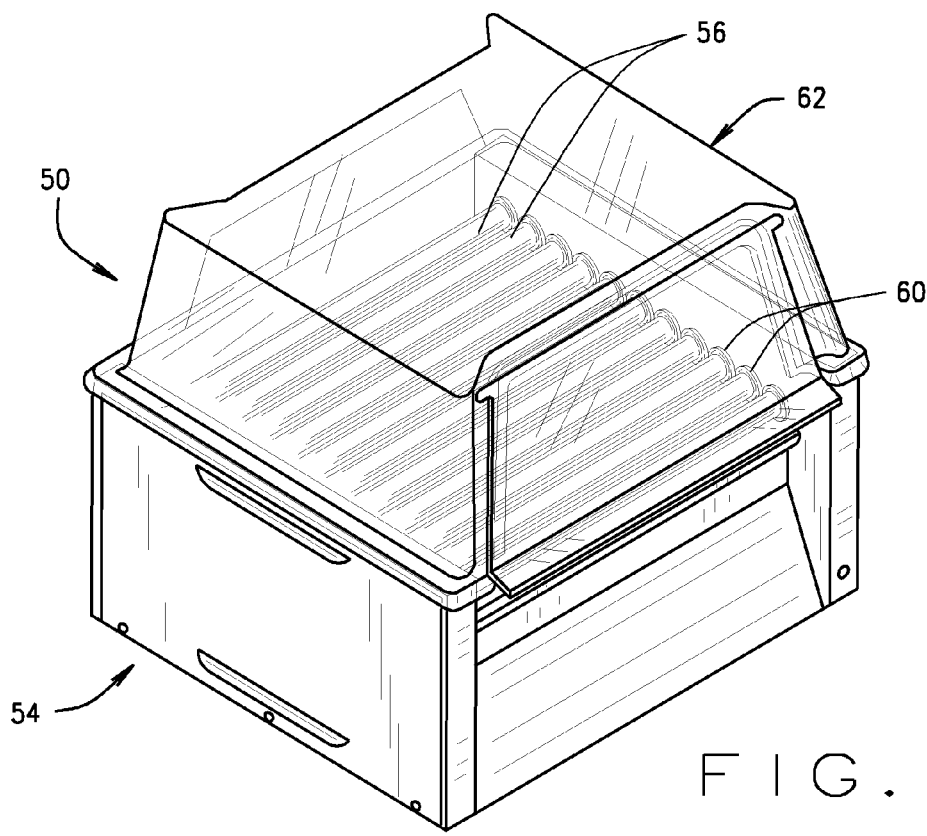
FIG. 1 is an isometric view of a prior art roller grill assembly similar to that shown in FIG. 1 of U.S. Pat. No. 6,393,971 B1.
Figure 2:
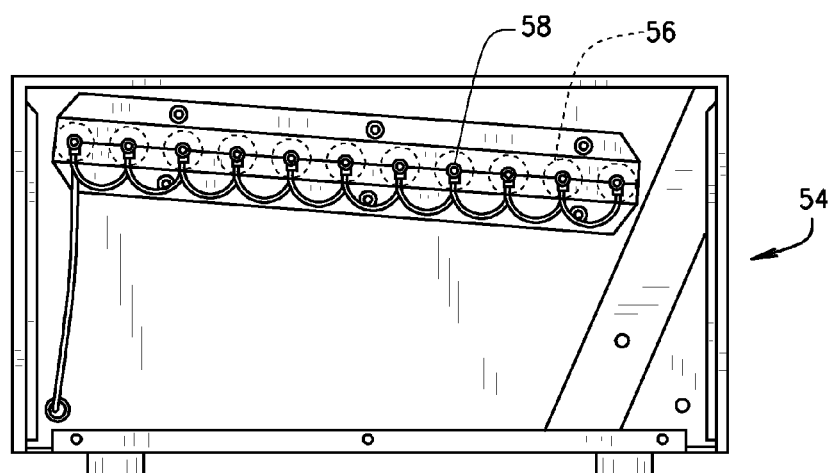
FIG. 2 is a side elevation of the prior art roller grill of FIG. 1, with the sneeze-guard cover removed, and with the right side of the wall disassembled and removed, similar to that of FIG. 7 of U.S. Pat. No. 6,393,971 B1.

FIGS. 1 and 2 hereof are taken from U.S. Pat. No. 6,393,971 B1, while FIG. 3 shows a drawing from U.S. Pat. No. 6,707,015 B2. With regard to FIGS. 1 and 2, the roller grill assembly 50 primarily comprises a main housing 54 upon which are mounted a plurality of rotatable cooking tubes 56 with interior tube heating members 58. The roller assembly 50 further comprises sealing subassemblies 60, and a sneeze guard cover 62. Assembly 50 further comprises a drive assembly disclosed in U.S. Pat. No. 6,393,971 B1.

FIG. 3 has similar components. FIG. 3 also shows prior art sensors 66 located at the end of, and in between, pairs of roller tubes 68.

Referring to FIGS. 5-8, which show isolated views of a sensing device 70, device 70 generally has a "T"-shape with arcuate sides about its midsection. More specifically, sensing device 70 has a generally flat bottom side 74 whose width can vary, but in one embodiment is about 0.867 in. wide. From its bottom 74, at each of its edges the device 70 extends upwardly into generally vertical lower sidewalls 77 and 80, whose height can vary, but in one embodiment are each about 0.093 inches tall. The tops of each of lower sidewalls 77 and 80 extend into a pair of arcuate sidewalls 83 and 86, respectively, whose dimensions are configured to extend adjacent the exterior contour of a roller tube it faces. In one embodiment, the radius for the sidewalls 83 and 86 is about 0.537 in. The radius is dependent upon the diameter of the roller tubes that sensor 70 abuts. At the upper end of each arcuate sidewall 83 and 86, device 70 has a generally vertical upper sidewall 89 and 92, respectively, whose length can vary but in one embodiment is about 0.175 in.

At the top of device 70, the device 70 has a generally flat upper surface 95. The device has a generally "T"-shaped outer surface 98, and a generally "T"-shaped inner surface 100. The sensor's thickness can vary. In one embodiment it is about 0.200 in. thick. The width of the upper surface 95 can vary. In an embodiment it is about 1.700 in.

At the device's upper surface 95, a generally cylindrical bore 103 has an upper opening 106, and extends downwardly with its lower end 109 being closed. Bore 103 receives a thermistor to be described. The diameter of bore 103 can vary, but in one embodiment it has a diameter of about 0.129 in. Toward the lower end of the device 70, a transverse bore 112 extends from the outer surface 98 through the inner surface 100 of the device 70. The transverse bore 112 receives the upper end of a hold-down spring to be described. The diameter of transverse bore 112 can vary, and its size can be dependent upon the diameter of the end of the end of the hold down spring inserted therein. In an embodiment, the diameter of bore 112 is about 0.093 in.

Sensor 70 can be of metal or other suitable material for conducting heat. 7075 Aluminum and 6013 Aluminum are suitable substances for the composition of sensing device 70.

Figure 9:
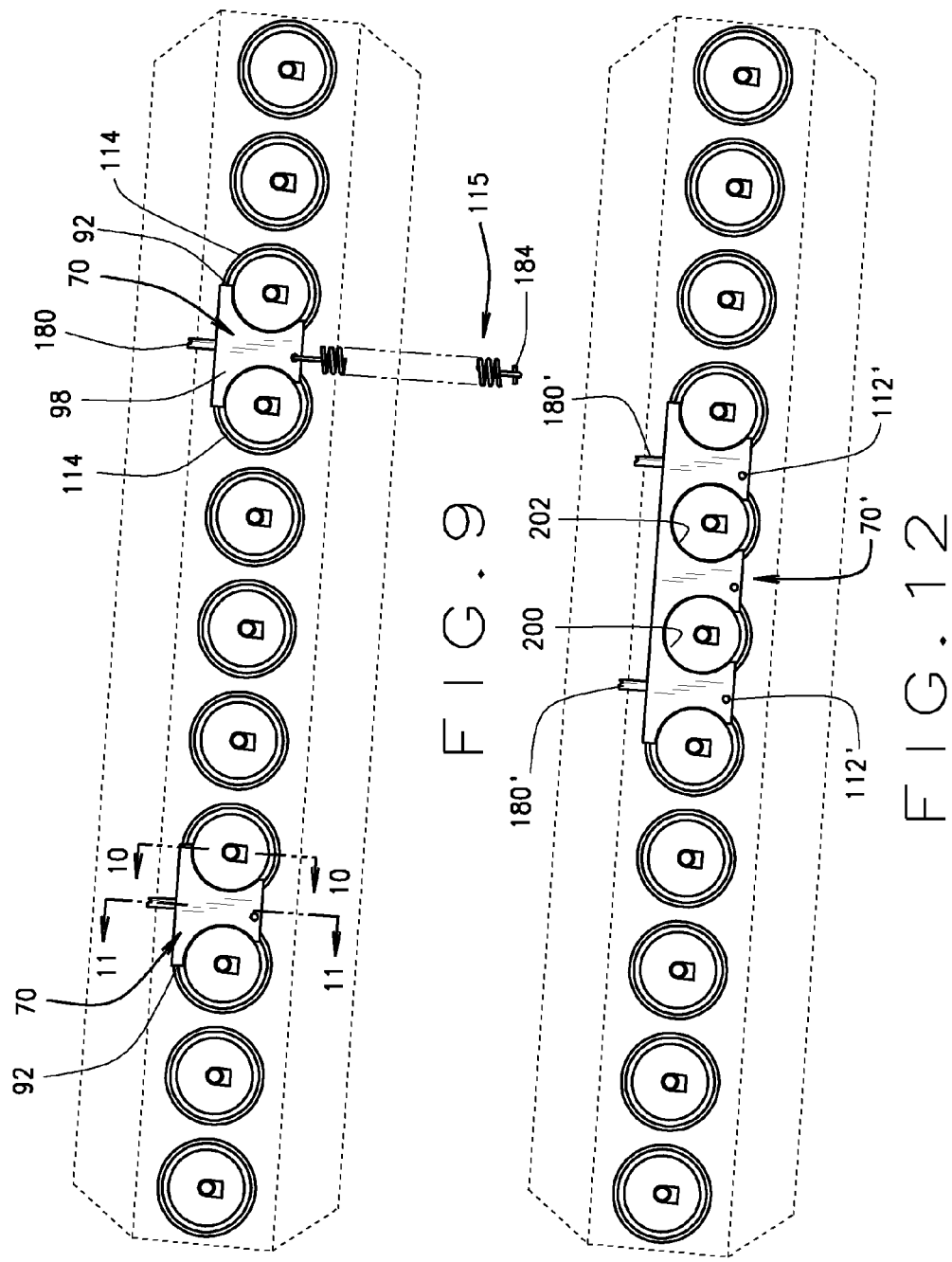
FIG. 9 is a partial side elevation of part of the roller grill assembly, showing two sensing devices of FIGS. 5-8, each mounted between a pair of roller tubes with sensing device surfaces in contact with the roller tubes, and with a hold-down spring shown mounted in connection with the sensing device shown to the right.
Figure 10:
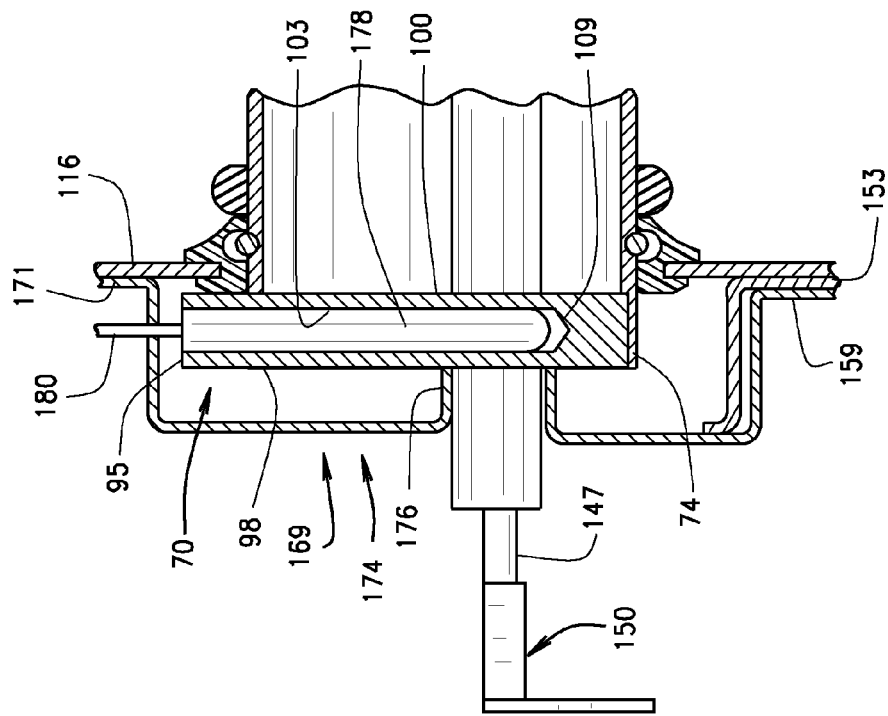
FIG. 10 is a section view taken on the line 10-10 of FIG. 9, showing the sensing device in contact with the outer surface of a roller tube, and showing the position of the heating element, supporting brackets and sealing components.
Figure 11:
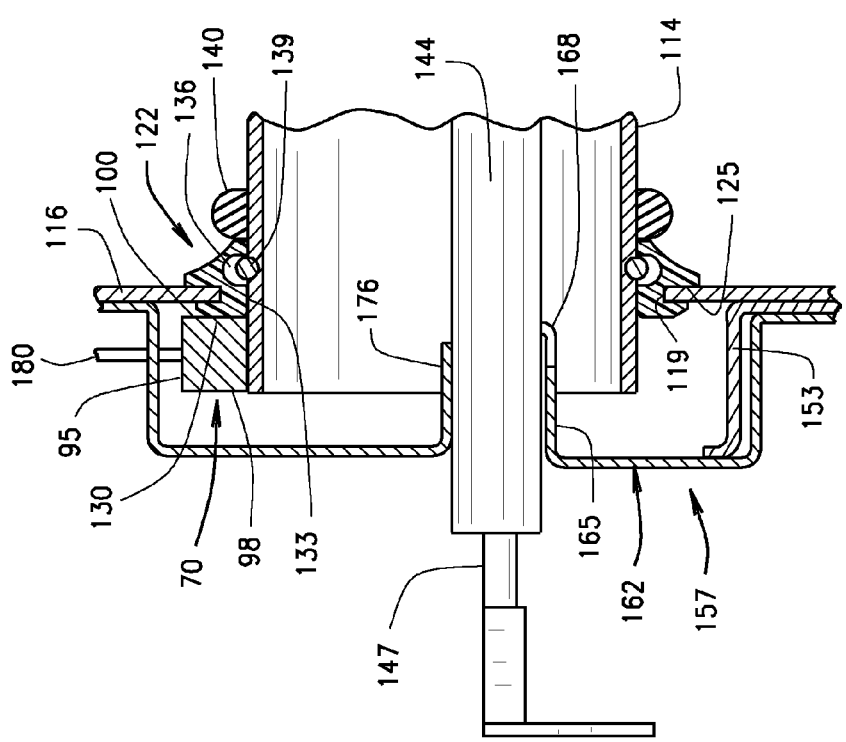
FIG. 11 is a section view taken on the line 11-11 of FIG. 9, showing the sensing device mounted about the exterior surface of a roller tube, and further showing a bore in the sensing device that houses a thermistor for sensing temperature.

FIG. 9 shows a view of two devices 70 each associated with a pair of roller tubes 114 on a roller grill. The surface of the roller tubes 114 can comprise a layer of an appropriate PTFE (polymer of tetrafluoroethylene) material on a steel tube. As seen in FIGS. 9-11, the device 70 can be mounted in the assembly to contact the outer surfaces of two of the roller tubes 114. In FIG. 9, upper sidewall 92 of sensing device 70 is shown extending slightly beyond the centerline of the tube 114 upon which centerline the section view of FIG. 10 is taken.

In FIG. 9 the device 70 shown to the right has a hold-down spring 115 secured to it, and the device 70 to the left of FIG. 8 does not have a hold-down spring shown. With regard to FIG. 9, the arcuate side surfaces 83 and 86 of device 70 generally fit flush against the conforming outer arcuate surface of the roller tube 114 which it faces. This allows heat to flow by conduction from the outer surface of each of said tubes 114 to the device 70.

Turning to FIGS. 10-11, there is illustrated a sensing device 70 mounted to be in contact with the outer surface of a roller tube 114. The housing wall 116 has a cylindrical bore 119 which receives an annular-shaped bearing 122. Bearing 122 can be of synthetic material such as plastic. Bearing 122 has an annular groove 125 which receives the adjacent housing wall 116 structure about the bore 119. The bearing 122 has an outer facing annular surface 130 that is generally flat, and which abuts the inner surface 100 of sensing device 70, as shown in FIGS. 10 and 11. Bearing 122 has a bore 133 within which is formed an annular recess 136 which receives an O-ring 139. The surface of bearing bore 133 receives the outer surface of roller tube 114 for rotation therein. An O-ring 140 extends about roller tube 114 to the inside of bearing 122.

As shown in FIGS. 10 and 11, a tubular heating member 144 shown as a rod, extends through roller tube 114. The end of heating rod 144 has a terminal 147 that is secured to an angled link 150 that connects to wiring. Further, as shown in FIGS. 10 and 11, a lower mount plate 153 is secured to housing wall 116 as by nuts and bolts. A lower tube support bracket 157 has its lower flanged section 159 secured to housing wall 116 as by nuts and bolts. Bracket 157 has a channel shaped section 162 which has an inner wall 165 that has an end 168 that bends upwardly to support heating rod 144. Above heating rod 144 an upper heating member support bracket 169 has its upper-flanged end 171 secured to the housing wall 116 as by nuts and bolts. Bracket 169 likewise has a channel-shaped section 174 with its lower flange 176 extending alongside, and in contact with, the surface of heating rod 144, so that it and the lower bracket 157 provide upper and lower stability and support for the heating rod 144.

With more specific reference to FIG. 11, a thermistor 178 is shown inserted within the sensing device bore 103. A pair of wires 180 extends from the thermistor 178 to provide feedback from the thermistor 178 as to temperature, so that a temperature probe is provided within sensing device 70. The thermistor 178 can be located within a steel jacket as shown in FIG. 11, and thus removable from the bore 103. A thermistor can also be potted directly within bore 103.

The support/stability brackets 157 and 168 help to shield the sensing devices 70 from ambient temperatures so that the sensing devices 70 react more closely to the temperature of the roller tubes only.

The spring 115 is shown as a helical coil spring which has a general straight horizontally extending upper end 157 that is snugly received with bore 112 at the lower end of device 70. The lower end of spring 115 can be looped to fit about, and be held by, a pin 184 that is mounted to housing wall 116 as by a weld, screw or nut. The lower end of spring 115 can be held to other parts of the roller grill structure as well. The spring 115 provides a gentle downward force against sensing device 70 to provide better contact of the arcuate surfaces 83 and 86 of device 70 with the surface of the roller tubes 114 that that device 70 abuts.

An electronic control 182 is electrically connected to the thermistors 178 and the heating elements 26 in order to sense the temperature of the rollers tubes 24 and, in response to the sensed temperature, control an electrical current provided to the heating elements 26. The control 182 operates by energizing a relay 184 that provides current to the heating elements 26 until a target temperature is reached. When the target temperature is reached, as determined by sensing an output from one of the thermistors 178, the control 182 de-energizes the relay 184 to stop electrical current to a set of heating elements 26. The control may optionally further include a timer function that prevents the relay 184 and thus the heating elements 26 from being cycled too quickly between the on and off state.

Figure 20:
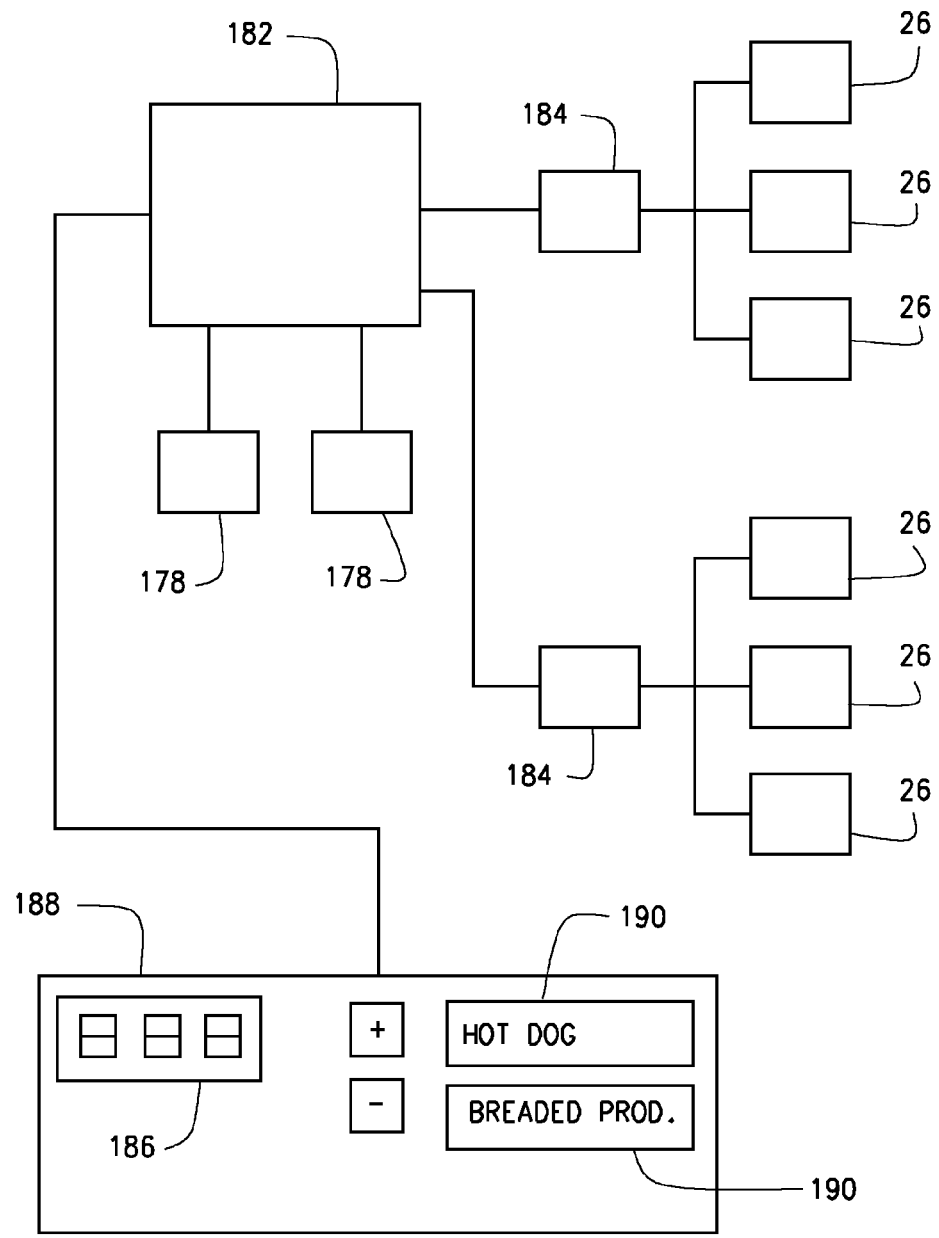
FIG. 20 is a schematic view of an electronic control system for temperature sensing devices such as disclosed herein.
Figure 21:
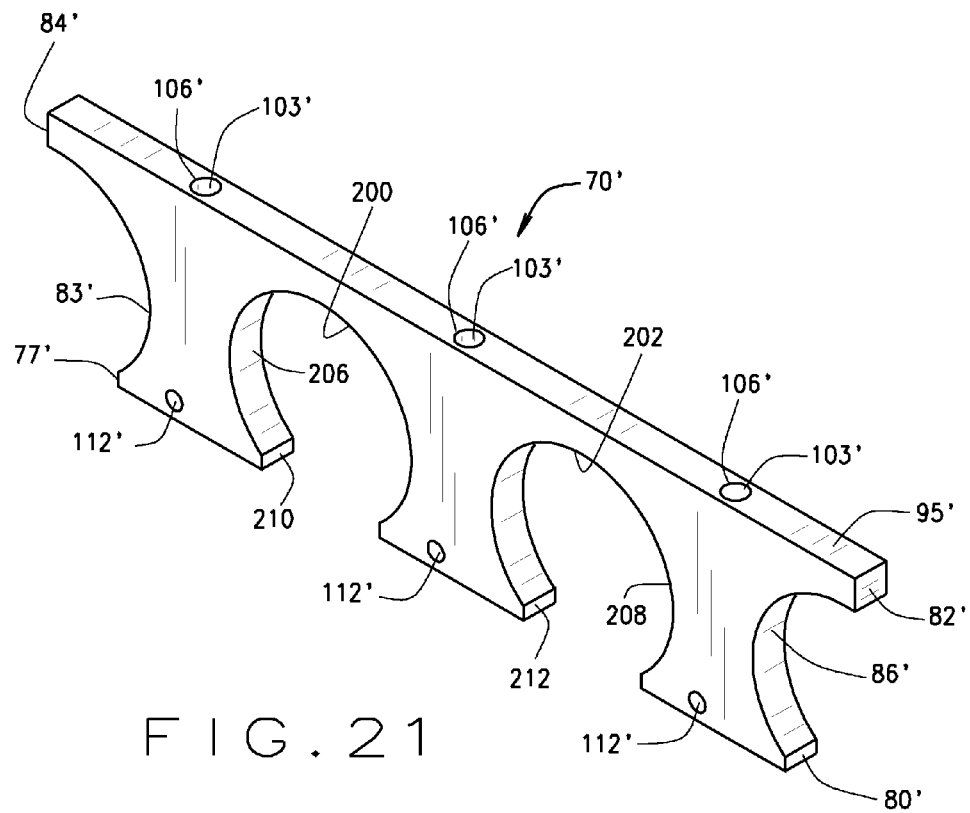
FIG. 21 is an isometric view of the embodiment of FIG. 12.
Figure 22:
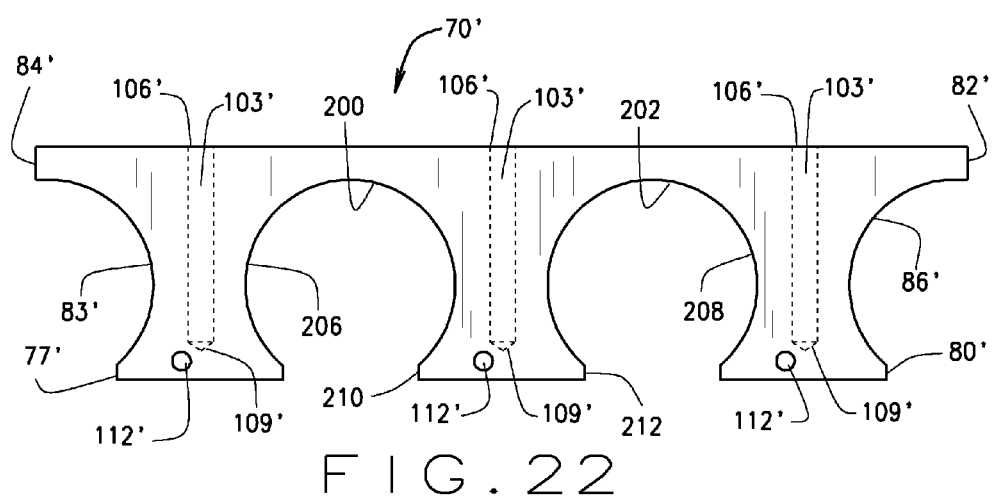
FIG. 22 is a front elevation of the sensing device of FIG. 21.

Referring to FIG. 20, the control 182 is further electrically connected to a display 186 and keypad 188. Using the keypad 188, a user can increase or decrease a set-point temperature for the control 182 to heat the roller tube 24. The keypad 188 can further include dedicated keys 190 indicating a certain type of food (for example, "hot dogs" or "breaded product") to auto-set the control 182 to a predetermined temperature set-points stored within the control 182 appropriate for that food product and roller grill model (for example, "with sneeze guard" and "without sneeze guard".

A second embodiment of the disclosure is shown in FIG. 12. A sensing device 70' is configured to fit about four roller tubes 114'. The outer ends of device 70' have lower and upper sidewalls 77', 80', 89' and 92', and arcuate sidewalls 83' and 86', that are configured and dimensioned as described for the embodiment of device 70 shown and described for FIGS. 5-9. In FIG. 12, device 70' is shown with its arcuate sidewalls 83' and 86' abutting the circular surfaces of their corresponding roller tubes 114a and 114b, so that those tubes can rotate and remain in heat conductive contact with surfaces 83' and 86'. In addition, sensing device 70' has two inner openings 200 and 202 that have arcuate inner walls 206 and 208. The radius of inner walls 206 and 208 is the same as that for arcuate sidewalls 83 and 86 of FIGS. 5-9. Like device 70, the arcuate wall radius of device 70' depends on the diameter of the roller tubes that it abuts.

However, the length of each of arcuate walls 206 and 208 is about twice as long as that of sidewalls 83 and 86, respectively, The lower ends of arcuate walls 206 and 208 terminate into vertical lower sidewalls 210 and 212 respectively. The heights of the lower sidewalls 210 and 212 are the same as that of sidewalls 77 and 80 of the FIG. 5-9 embodiment. Device 70' has three transverse bores 112' for receiving the upper end of springs such as spring 115 of the FIGS. 5-9 embodiment. Device 70' has three vertical bores 103' like that of bore 103 of FIGS. 5-9, which receive thermistors having wires 180'. Device 70' thus provides for temperature readings that are based on heat conducted from four roller tubes, and thus with a single sensing device gives a greater sourcing for overall reading of temperature than does the embodiment of FIGS. 5-9. If desired, another thermistor could be placed in a bore located at the center of the top of device 70'.

Thus it can be seen that with the embodiments of FIGS. 5-12, temperature feedback is received from two or more rollers to the respective sensing device. This provides more accurate and consistent reading of the temperature of the actual roller tubes that are conveying heat directly to the foods being cooked thereon.

A third embodiment of the disclosure is shown in FIGS. 13-15. This embodiment combines heat sink and sensing features with bushing or bearing features. As seen in FIGS. 13-15, the sensor/bushing device 300 has a cylindrical section 302 with ring lands 305 for receiving parts of a snap ring and inner cover (not shown) to hide and seal the sensor/bushing device 300. Cylindrical section 302 has a bore 308 with an inner cylindrical surface 311. Surface 311 has a diameter configured to receive a roller tube 114'' for smooth rotation therein, as shown in FIG. 15, but sufficient to allow conductive transfer of heat from the roller tube 114'' surface to the sensor/bushing device 300. A flange 315 of a partial circular shape extends outwardly from the proximal end of cylindrical section 302.

Sensor/bushing 300 has a temperature sensing receiving section 320, which has somewhat of a rectangular prism configuration, with a generally flat vertical sidewall 323 and a generally flat horizontal top wall 326. Top wall 326 has a downwardly extending bore 329 extending there through. Bore 329 preferably has a closed lower end and can be of the same configuration as described for bore 103 in the embodiment of FIGS. 5-9. As with the embodiment of FIGS. 5-9, bore 329 can receive a temperature probe in the form of a thermistor in a steel jacket, such as illustrated in FIG. 11. As seen in FIG. 15, wires 180'' extend to the thermistor seated within bore 329.

The sensor/bushing flanged section 315 has towards its lower end a preferably generally vertical notch 332. Notch 332 is configured to receive a projection or tab extending from the housing wall 116'' to hold the sensor/bushing device 300 against rotation relative to the housing wall 116'' that could occur from the rotational frictional force exerted by roller tube 114''.

The sensor/bushing device can be of suitable material including metal, such as SAE 660 bronze, for example. The sensor/bushing device can also be impregnated with other materials for anti-wear, anti-squeak, and improved thermal conductivity.

A fourth embodiment of the disclosure is shown in FIGS. 16-18. Like the third embodiment this embodiment combines heat sink and sensing features with bushing or bearing features. As seen in FIGS. 16-18 a sensor/bushing device 400 has two cylindrical sections 402 and 404, each having exterior ring lands 305 for snap ring and inner cover (not shown) to hide and seal the device 400, threads (annular projecting rims) 408 and 411, respectively. Each of the cylindrical sections 402 and 404 has a bore 414 and 417, respectively, each of which has a cylindrical surface 420 and 423, respectively. Each of the cylindrical surfaces 420 and 423 have a diameter configured to receive a roller tube 114''' for smooth rotation therein, as shown in FIG. 18, but sufficient to allow conductive transfer of heat from the roller tube 114''' to the surface of the sensor/bushing device 400. Flanges 428 and 431, each of a partial circular shape, extend outwardly from the proximal ends of the cylindrical sections 402 and 404, respectively.

Sensor/bushing 400 has a temperature sensing receiving section 435 which has a generally flat upper surface 438 from which downwardly extends a closed-end bore 441. The distal side 444 of section 435 is generally flat. The lower wall 447 of section 435 is generally flat. Bore 441 can be of the same configuration as described for bore 329 in the embodiment of FIGS. 13-15, and for bore 103 in the embodiment of FIGS. 5-9. As with those embodiments, bore 441 can receive a temperature probe in the form of a thermistor in a steel jacket, such as illustrated in FIG. 11. As seen in FIG. 18, wires 180''' extend to the thermistor seated within bore 441.

The outer-flanged sections 428 and 431 each have towards their lower ends preferably generally vertical notch 450 and 452, respectively. Notches 450 and 452 each are configured to receive a projection or tab extending from the housing wall 116''' to hold the sensor/bushing device 400 against rotation relative to the housing wall. Sensor/bushing device 400 can have the same composition as described for device 300.

Figure 19:
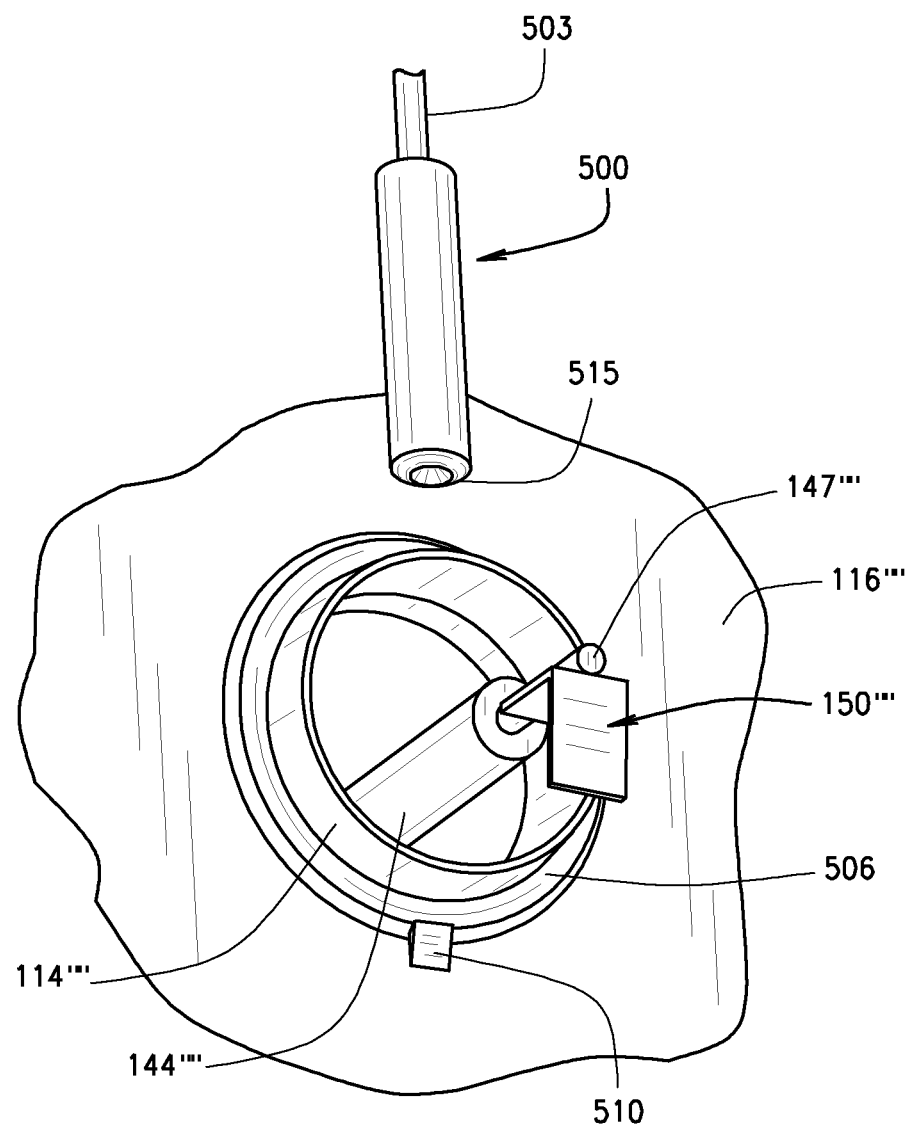
FIG. 19 is an isometric view illustrating a temperature sensing device in an arrangement for infrared temperature sensing.

A fifth embodiment of the disclosure is shown is FIG. 19. FIG. 19 discloses an infrared sensing device 500 connected to wiring 503. FIG. 19 shows a housing wall 116'''' which supports a bearing 506 within which a roller tube 114'''' rotates. The bearing outer flange can have a notch which receives a projecting tab 510 from wall 116'''', to resist rotation of the bearing 506. A heating element 144'''' extends through the roller tube 114'''' and has a terminal extension 147'''' to which a connecting link 150'''' is joined. The sensor 500 can be supported by a sheet metal bracket extending from the housing wall 116''''.

The lower end of the sensor 515 is preferably between about ½ in. to about ¾ in. from the top surface of the roller tube 114'''' as the roller tube 114'''' rotates. The infrared sensor can be a commercially available type such as offered through www.omega.com by OMEGA Engineering Inc., telephone No. 888-826-6342 United States. They include models with built-in air purge, which are preferred, such as OMEGA models OS36-2 and OS36-5. Also suitable are those such as sold as Model No. OS365M-K. Additional suitable infrared sensors include recalibrated models such as Models IRt/c.5 and IRt/c.10, of Exergen Corporation, 51 Water Street, Watertown, Mass. 02172, having air purge features. It is preferable to use an infrared sensing device that maintains its ability of measuring and maintaining calibration under operating conditions over a long period of time.

In view of the above, it will be seen that advantages of the present invention have been achieved and other advantageous results have been obtained.

Having thus described the invention, what is claimed and desired to be secured by Letters Patent is:

1. In a grill assembly for cooking human food, said assembly having a housing and tubular cooking members rotatably mounted in association with the housing, said cooking members having a cylindrical outer surface, improvements comprising:
   a sensing device for mounting in association with the grill assembly to be positioned between at least two roller tubes, the sensing device having first and second sides, each of the first and second sides having an arcuate-shaped surface shaped to correspond to the surface of an adjacent roller tube to contact the tube surface;
   a temperature-sensing probe mounted with the sensing device for detecting the temperature of the sensing device; and
   a biasing member, the sensing device and biasing member being configured so that the biasing member can be connected with the sensing device, the biasing member and the housing having configurations so that the biasing member can be secured with the housing so that the sensing device is biased to move part of the sensing device against the cylindrical surfaces of the roller tubes with which it is adjacent.

2. In the grill assembly of claim 1, wherein the roller tubes include tubes with a heating element disposed within the tube; further comprising:
   a temperature-sensing probe mounted with the sensing device for detecting the temperature of the sensing device;
   a control in electrical connection with the temperature-sensing probe and also in electrical connection with a heating element disposed within the roller tube, wherein the control is adapted to stop electrical current from flowing to the heating element when a temperature sensed by the temperature-sensing probe exceeds a set-point and provide electrical current to the heating element when the temperature sensed by the temperature sensing probe is below the set-point; and
   the control further electrically connected to a display and to a keypad, the control adapted to display the set-point on the display and the control further adapted to receive an input from the keypad to allow a user to modify the set-point.

3. In the grill assembly of claim 1, further comprising the sensing device having a temperature-sensing receiving section having a bore extending therein for receiving the probe.

4. In the grill assembly of claim 2 wherein the keypad further comprises a plurality of keys for modifying the set-point through a single keypress to a set-point associated with each of the plurality of keys.

5. In a grill assembly for cooking human food, said assembly having a housing and tubular cooking members rotatably mounted in association with the housing, said cooking members having a cylindrical outer surface, improvements comprising:
   a sensing device for mounting in association with the grill assembly to be positioned between at least two roller tubes, the sensing device having first and second sides, each of the first and second sides having an arcuate-shaped surface shaped to correspond to the surface of an adjacent roller tube to contact the tube surface;
   the sensing device having at least one inner opening located between the first and second sides, the inner opening having an arcuate shaped wall with a surface shaped to conform to the curvature of the outer surface of a roller tube received within the opening to contact the surface of the received roller tube, the length of the surface of the inner opening wall being about twice as long as the length of the sidewalls.

6. In the grill assembly of claim 5, wherein the roller tubes include tubes with a heating element disposed within the tube; further comprising:
   a temperature-sensing probe mounted with the sensing device for detecting the temperature of the sensing device;
   a control in electrical connection with the temperature-sensing probe and also in electrical connection with a heating element disposed within the roller tube, wherein the control is adapted to stop electrical current from flowing to the heating element when a temperature sensed by the temperature-sensing probe exceeds a set-point and provide electrical current to the heating element when the temperature sensed by the temperature sensing probe is below the set-point; and the control further electrically connected to a display and to a keypad, the control adapted to display the set-point on the display and the control further adapted to receive an input from the keypad to allow a user to modify the set-point.

7. In the grill assembly of claim 5, further comprising the sensing device having a temperature-sensing receiving section having a bore extending therein for receiving the probe.

8. In the grill assembly of claim 6 wherein the keypad further comprises a plurality of keys for modifying the set-point through a single keypress to a set-point associated with each of the plurality of keys.

9. In a grill assembly for cooking human food, said assembly having a housing and tubular cooking members rotatably mounted in association with the housing, said cooking members having a cylindrical outer surface, improvements comprising:
   a sensing device for mounting in association with the grill assembly, the sensing device comprising a bushing having a cylindrically shaped opening with an inner circular shaped surface sized to receive a roller tube and contact the surface of the received roller tube;
   the bushing having a flange extending in a direction outwardly from the cylindrical opening, the flange having a notch configured to receive a tab projecting from the housing; and
   a temperature-sensing probe mounted with the sensing device for detecting the temperature of the sensing device.

10. In the grill assembly of claim 9, wherein the roller tubes include tubes with a heating element disposed within the tube; further comprising:
   a control in electrical connection with the temperature-sensing probe and also in electrical connection with a heating element disposed within the roller tube, wherein the control is adapted to stop electrical current from flowing to the heating element when a temperature sensed by the temperature-sensing probe exceeds a set-point and provide electrical current to the heating element when the temperature sensed by the temperature sensing probe is below the set-point; and
   the control further electrically connected to a display and to a keypad, the control adapted to display the set-point on the display and the control further adapted to receive an input from the keypad to allow a user to modify the set-point.

11. In the grill assembly of claim 9, further comprising the sensing device having a temperature-sensing receiving section having a bore extending therein for receiving the probe.

12. In the grill assembly of claim 10 wherein the keypad further comprises a plurality of keys for modifying the set-point through a single keypress to a set-point associated with each of the plurality of keys.

13. In a grill assembly for cooking human food, said assembly having a housing and tubular cooking members rotatably mounted in association with the housing, said cooking members having a cylindrical outer surface, improvements comprising:
   a sensing device for mounting in association with the grill assembly, the sensing device comprising a bushing having at least two cylindrically shaped openings each having a cylindrically shaped opening with an inner circular shaped surface sized to receive a roller tube and contact the surface of the received roller tube; and
   a temperature-sensing probe mounted with the sensing device for detecting the temperature of the sensing device.

14. In the grill assembly of claim 13 wherein the roller tubes include tubes with a heating element disposed within the tube; further comprising:
   a control in electrical connection with the temperature-sensing probe and also in electrical connection with a heating element disposed within the roller tube, wherein the control is adapted to stop electrical current from flowing to the heating element when a temperature sensed by the temperature-sensing probe exceeds a set-point and provide electrical current to the heating element when the temperature sensed by the temperature sensing probe is below the set-point; and
   the control further electrically connected to a display and to a keypad, the control adapted to display the set-point on the display and the control further adapted to receive an input from the keypad to allow a user to modify the set-point.

15. In the grill assembly of claim 13, further comprising the sensing device having a temperature-sensing receiving section having a bore extending therein for receiving the probe.

16. In the grill assembly of claim 14 wherein the keypad further comprises a plurality of keys for modifying the set-point through a single keypress to a set-point associated with each of the plurality of keys.

* * * * *